US012126968B2

(12) United States Patent
Shinden et al.

(10) Patent No.: US 12,126,968 B2
(45) Date of Patent: Oct. 22, 2024

(54) HEARING AID ADJUSTMENT SYSTEM AND HEARING AID ADJUSTMENT METHOD

(71) Applicant: OTOCURE INC., Utsunomiya (JP)

(72) Inventors: Seiichi Shinden, Utsunomiya (JP); Daisuke Suzuki, Utsunomiya (JP)

(73) Assignee: Octocure Inc., Tochigi (JP)

( * ) Notice: Subject to any disclaimer, the term of this patent is extended or adjusted under 35 U.S.C. 154(b) by 162 days.

(21) Appl. No.: 17/917,786

(22) PCT Filed: Aug. 7, 2020

(86) PCT No.: PCT/JP2020/030396
§ 371 (c)(1),
(2) Date: Oct. 7, 2022

(87) PCT Pub. No.: WO2022/030002
PCT Pub. Date: Feb. 10, 2022

(65) Prior Publication Data
US 2023/0156417 A1 May 18, 2023

(51) Int. Cl.
*H04R 25/00* (2006.01)

(52) U.S. Cl.
CPC ............ *H04R 25/70* (2013.01); *H04R 25/30* (2013.01)

(58) Field of Classification Search
None
See application file for complete search history.

(56) References Cited

U.S. PATENT DOCUMENTS 8,885,838 B2 11/2014 Paludan-Muller et al.
2007/0237346 A1 10/2007 Fichtl et al.
2009/0154743 A1* 6/2009 Lundh .................... H04R 25/70 381/312
2012/0140937 A1* 6/2012 Poe ........................ H04R 25/70 381/60
2015/0350794 A1* 12/2015 Pontoppidan ........ A61B 5/6815 381/321

FOREIGN PATENT DOCUMENTS

JP H04-242400 A 8/1992
JP H08-163700 A 6/1996
JP 2013-512632 A 4/2013
JP 2017-069762 A 4/2017

OTHER PUBLICATIONS

Shinden, Seiichi, "Hearing and Brain Training (translated from Japanese)", Rion Co., Ltd., 2017.

* cited by examiner

*Primary Examiner* — Kenny H Truong
(74) *Attorney, Agent, or Firm* — Carrier, Shende & Associates P.C.; Joseph P. Carrier; Fulchand P. Shende

(57) ABSTRACT

A hearing aid adjustment system is provided that can efficiently improve hearing while alleviating excessive stress to be felt by a user after adjustment of a set value of a hearing aid at each phase is performed. An adjustment system S includes a target set value decision unit 3*b* which decides the target set value, a first set content decision unit 3*c* which decides the set value at each phase based on the target set value, a wearing time measurement unit 3*e* which measures a wearing time of a hearing aid 2 of a user after previous adjustment, and an adjustment processing unit 3*d* which performs adjustment of the hearing aid 2 based on the set value at each of the phases. In adjustment at each of the phases, the adjustment processing unit 3*d* corrects the present set value based on the measured wearing time.

7 Claims, 7 Drawing Sheets

HEARING AID ADJUSTMENT SYSTEM AND HEARING AID ADJUSTMENT METHOD

TECHNICAL FIELD

The present invention relates to a hearing aid adjustment system and a hearing aid adjustment method which changes a set value about an amplification degree with respect to sound of a hearing aid at each predetermined period and thereby performs adjustment such that the set value gradually approaches a target set value.

BACKGROUND ART

In related art, a set value of an amplification degree with respect to sound of a hearing aid is set in accordance with characteristics of a user who uses the hearing aid. For example, a system for adjusting the set value has been known which refers to characteristics of auditory perception of the user, reactions to sounds by the user in setting, and so forth and defines the set value (for example, see Patent Literature 1).

Adjustment of sound of a hearing aid by the system disclosed in Patent Literature 1 is performed in purchase of the hearing aid, in periodical maintenance of the hearing aid after purchase, when the user demands the adjustment, and so forth. Then, the set value in the adjustment is defined based on a state of the user on each occasion.

However, a user who has never used a hearing aid or has used a hearing aid adjusted based on a different set value is not accustomed to sound based on the set value defined as described above. Thus, by using a hearing aid for purpose of improving hearing, conversely, such a user has difficulty in listening to necessary sounds (for example, voices of persons) and might feel excessive stress.

Accordingly, the applicant of the present application suggests a procedure referred to as “Utsunomiya Method Auditory Rehabilitation” (Trademark Application No. 2020-042149) in which rehabilitation is performed such that a user is accustomed to sound amplified by a hearing aid (for example, see Non Patent Literature 1).

In the procedure, the set value is changed in each predetermined period and is thereby adjusted such that the set value gradually approaches a final target set value. Accordingly, because the user can little by little be accustomed to sound amplified by the hearing aid, the user can use the hearing aid without feeling excessive stress and efficiently improve hearing.

CITATION LIST

Patent Literature

Patent Literature 1
Japanese Patent Laid-Open No. 2017-069762

Non Patent Literature

Non Patent Literature 1
Shinden, Seiichi, “Hearing and Brain Training (translated from Japanese)”, RION CO., LTD., 2017.

SUMMARY OF INVENTION

Technical Problem

Incidentally, how much a user can be accustomed to sound based on a set value in the same period depends on each user. Thus, in a case where the set value is evenly adjusted in adjustment of the set value at each phase, some users might feel excessive stress due to sound based on an adjusted set value before hearing is improved.

The present invention has been made in consideration of the above problems, and an objective thereof is to provide a hearing aid adjustment system and a hearing aid adjustment method that can efficiently improve hearing while alleviating excessive stress to be felt by a user after adjustment of a set value of a hearing aid at each phase is performed.

Solution to Problem

A hearing aid adjustment system of the present invention is

- a hearing aid adjustment system performing adjustment at a start of each of multiple predetermined periods such that a set value about an amplification degree with respect to sound of a hearing aid gradually approaches a target set value in each of the predetermined periods by changing the set value in each predetermined period, the hearing aid adjustment system including:
- a target set value decision unit which decides the target set value;
- a set content decision unit which decides the set value in each of the predetermined periods based on the target set value;
- a wearing time measurement unit which measures a wearing time of the hearing aid of a user of the hearing aid in each of the predetermined periods; and
- an adjustment processing unit which performs adjustment of the hearing aid based on the set value in each of the predetermined periods, in which
- in adjustment at the start of each of the predetermined periods, the adjustment processing unit corrects the set value corresponding to the present predetermined period based on the wearing time measured in a previous one of the predetermined periods.

A strong correlation is present between how much the user is accustomed to the sound amplified by the hearing aid and the wearing time of the hearing aid. That is, the wearing time can be considered to be a degree of accustomedness to sound based on the set value in the wearing time.

Accordingly, as described above, in the hearing aid adjustment system of the present invention, in adjustment at each of the phases, the present set value is corrected based on the measured wearing time. Accordingly, sound based on a new set value can be made sound close to the sound to which the user is accustomed so far.

Consequently, in the hearing aid adjustment system of the present invention, because even when the set value is changed, the sound based on the set value can be made the sound close to the sound to which the user is accustomed, hearing can efficiently be improved while excessive stress to be felt by the user is alleviated.

Further, in the hearing aid adjustment system of the present invention,

- in a case where the measured wearing time is below a first predetermined time, in adjustment after the wearing time is measured, the adjustment processing unit preferably corrects the present set value such that as a difference between the wearing time and the first predetermined time is larger, a change amount of the set value becomes smaller.

In a case where the wearing time in a certain period is shorter than a threshold value (the first predetermined time defined by studies and analyses), as a difference between the wearing time in the period and the first predetermined time assumed to be necessary for accustoming the user in the period is larger, the possibility is higher that the user is not accustomed to sound based on the set value corresponding to the period. Note that as the first predetermined time, for example, a time such as a time corresponding to a lower limit value of a recommended wearing time in performing rehabilitation about use of the hearing aid can be employed.

Accordingly, as described above, when a configuration is made such that the present set value is corrected such that the change amount of the set value becomes smaller as the difference is larger, the sound based on the present set value becomes sound close to the sound based on the previous set value. Accordingly, even in such a case, the user is easily accustomed to the sound based on the present set value. Further, immediately after a change in the set value, hearing can efficiently be improved while excessive stress to be felt by the user is alleviated.

Further, a hearing aid adjustment system of the present invention is a hearing aid adjustment system for performing adjustment such that a set value about an amplification degree with respect to sound of a hearing aid gradually approaches a target set value by changing the set value in each of multiple predetermined periods, the hearing aid adjustment system including:

a target set value decision unit which decides the target set value;

a set content decision unit which decides the set value in each said predetermined period based on the target set value;

a wearing time measurement unit which measures a wearing time of the hearing aid of a user of the hearing aid after previous adjustment; and an adjustment processing unit which performs adjustment of the hearing aid based on the set value each said predetermined period, in which.

in a case where the measured wearing time is below a second predetermined time which is shorter than the first predetermined time, in adjustment after the wearing time is measured, the adjustment processing unit preferably corrects the present set value such that the set value agrees with the previous set value regardless of the difference between the wearing time and the first predetermined time.

In a case where the wearing time in a certain period is below a threshold value (the second predetermined time defined by studies and analyses), the user might not at all be accustomed to the sound based on the previous set value. Note that as the second predetermined time, for example, a lower limit value or the like of a wearing time necessary for the user to be accustomed to the set value at the time point in performing rehabilitation about use of the hearing aid can be employed.

Accordingly, in such a case, as described above, when a configuration is made such that the set value agrees with the previous set value, the user can be inhibited from feeling sounds based on the present and subsequent set values to be extremely loud. Accordingly, hearing can efficiently be improved while excessive stress to be felt by the user is alleviated.

Further, a hearing aid adjustment system of the present invention is a hearing aid adjustment system for performing adjustment such that a set value about an amplification degree with respect to sound of a hearing aid gradually approaches a target set value by changing the set value in each of multiple predetermined periods, the hearing aid adjustment system including:

a target set value decision unit which decides the target set value;

a set content decision unit which decides the set value in each said predetermined period based on the target set value;

a wearing time measurement unit which measures a wearing time of the hearing aid of a user of the hearing aid after previous adjustment; and an adjustment processing unit which performs adjustment of the hearing aid based on the set value at each said predetermined period, in which, in a case where the measured wearing time exceeds a third predetermined time, in adjustment after the wearing time is measured, the adjustment processing unit preferably corrects the present set value such that as a difference between the wearing time and the third predetermined time is larger, a change amount of the set value becomes larger.

In a case where the wearing time in a certain period is as sufficiently long as exceeding a threshold value (the third predetermined time defined by studies and analyses), as a difference between the wearing time in the period and the third predetermined time assumed to be necessary for accustoming the user in the period is larger, the possibility is higher that the user is accustomed, more than assumption, to sound based on the set value corresponding to the period. Note that as the third predetermined time, for example, an upper limit value or the like of the recommended wearing time in performing rehabilitation about use of the hearing aid can be employed.

Accordingly, as described above, even when a configuration is made such that the present set value is corrected such that the change amount of the set value becomes larger as the difference is larger, the user can be accustomed to the sound based on the present set value without excessive stress. Further, in such a configuration, because the remaining change amount can be reduced, the number of adjustments necessary for reaching the final target set value can be reduced.

Further, in the hearing aid adjustment system of the present invention, in a case of a configuration in which the change amount is made larger as the wearing time is longer, in a case where the measured wearing time exceeds a fourth predetermined time which is longer than the third predetermined time, in adjustment after the wearing time is measured, the adjustment processing unit preferably corrects the present set value such that the change amount of the set value becomes a constant amount regardless of the difference between the wearing time and the third predetermined time.

As described above, in a case where the wearing time in a certain period exceeds a threshold value (the fourth predetermined time defined by studies and analyses), when a configuration is made such that the change amount of the set value becomes a constant amount, the sound based on the present set value does not become extremely loud compared to the sound based on the previous set value. Accordingly, immediately after a change in the set value, hearing can efficiently be improved while excessive stress to be felt by the user is alleviated.

Note that as the fourth predetermined time, for example, an upper limit value or the like of a wearing time can be employed in which a degree of accustomedness of the user to sound with respect to the wearing time is unlikely to be improved for the set value at the time point in performing rehabilitation about use of the hearing aid.

Further, a hearing aid adjustment system of the present invention is a hearing aid adjustment system performing adjustment at a start of each of multiple predetermined periods such that a set value about an amplification degree with respect to sound of a hearing aid gradually approaches a target set value in each of the predetermined periods by changing the set value in each said predetermined period, the hearing aid adjustment system including a setting terminal that includes a target set value decision unit which decides the target set value, a set content decision unit which decides the set value in each of the predetermined periods based on the target set value, a wearing time measurement unit which measures a wearing time of the hearing aid of a user of the hearing aid in each said predetermined period, and an adjustment processing unit which performs adjustment of the hearing aid based on the set value in each said predetermined period, in which the setting terminal and the hearing aid are capable of mutual information communication, and in adjustment at at the start of each said predetermined period, the adjustment processing unit corrects the set value corresponding to the present predetermined period based on the wearing time measured in the previous predetermined period.

Further, an adjustment method of a hearing aid of the present invention is a hearing aid adjustment method of performing adjustment at a start of each of multiple predetermined periods such that a set value about an amplification degree with respect to sound of a hearing aid gradually approaches a target set value in each of the predetermined periods by changing the set value in each predetermined period, the hearing aid adjustment method including:

a step of deciding the target set value;

a step of deciding the set value in each of the predetermined periods based on the target set value;

a step of measuring a wearing time of the hearing aid of a user of the hearing aid in each of the predetermined periods; and a step of performing adjustment of the hearing aid based on the set value in each of the predetermined periods, in which in the step of performing adjustment of the hearing aid, in adjustment at the start of each of the predetermined periods, the present set value is corrected based on the wearing time measured in the previous predetermined period.

DESCRIPTION OF EMBODIMENT

A configuration of an adjustment system S (hearing aid adjustment system) according to an embodiment will hereinafter be described with reference to drawings.

[Outline Configuration of System]

Figure 1:
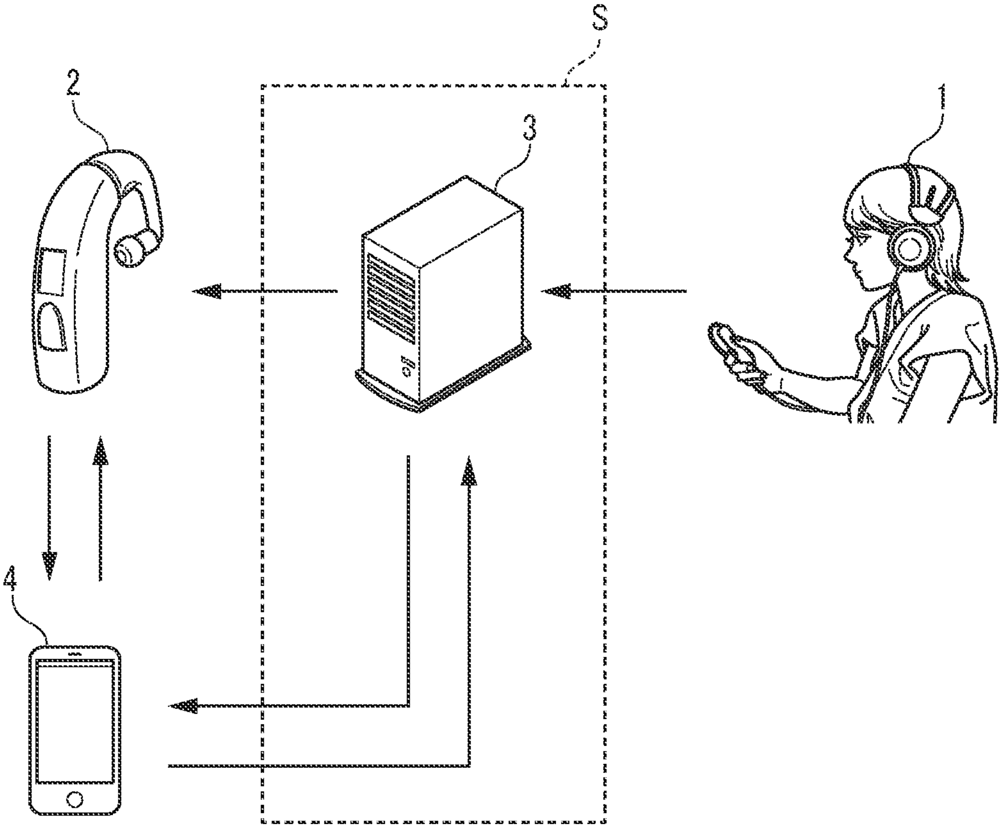
FIG. 1 is an explanatory diagram illustrating an outline configuration of an adjustment system according to an embodiment.

As illustrated in FIG. 1, the adjustment system S is a system which changes a set value about an amplification degree with respect to sound of a hearing aid 2 in each predetermined period based on a result of pure-tone audiometry by an audiometry device 1 and thereby causes the set value to gradually approach a target set value.

As the audiometry device 1, an audiometer is employed in the present embodiment. The audiometry device 1 recognizes a result of audiometry of a user who uses the hearing aid 2 and outputs the result to a paper medium or the like. The output result of the audiometry is transmitted to the adjustment system by an adjustment person of the hearing aid such as a speech-language-hearing therapist. Specifically, the audiometry device 1 recognizes a hearing ability level at each frequency used in the pure-tone audiometry and outputs the hearing ability level as the result of the audiometry.

Note that the adjustment system S employs the result of the pure-tone audiometry as a reference in defining the set value of the hearing aid 2, but the hearing aid adjustment system of the present invention is not limited to such a configuration, and a content of hearing loss, a demand or the like of the user, or a combination of those as results of other examinations may be used as a reference. For example, a result or the like of speech audiometry, sound field audiometry, a tinnitus examination, or a directional hearing ability examination or a purpose of use or the like of the hearing aid of the user may be used as a reference.

Further, an output form from the audiometry device is not limited to a paper medium or the like but may be electronic data. In a case where an output is performed by electronic data as described above, a configuration may be made such that the data are directly transmitted from the audiometry device to the hearing aid adjustment system.

The adjustment system S is configured with a setting terminal 3 which is installed in a hospital, a store, or the like and is a personal computer or the like used by the adjustment person.

The hearing aid 2 and the setting terminal 3 are configured to be capable of mutual information communication through short-distance wireless communication, wired communication, or the like. Further, the setting terminal 3 is configured to be capable of mutual information communication with an adjustment terminal 4 such as a smartphone or a tablet used by the user himself/herself of the hearing aid 2 or a family member of the user through an Internet network, a public line, or the like. Further, the hearing aid 2 and the adjustment terminal 4 are configured to be capable of mutual information communication through short-distance wireless communication, wired communication, or the like.

[Configurations of Processing Units]

Figure 2:
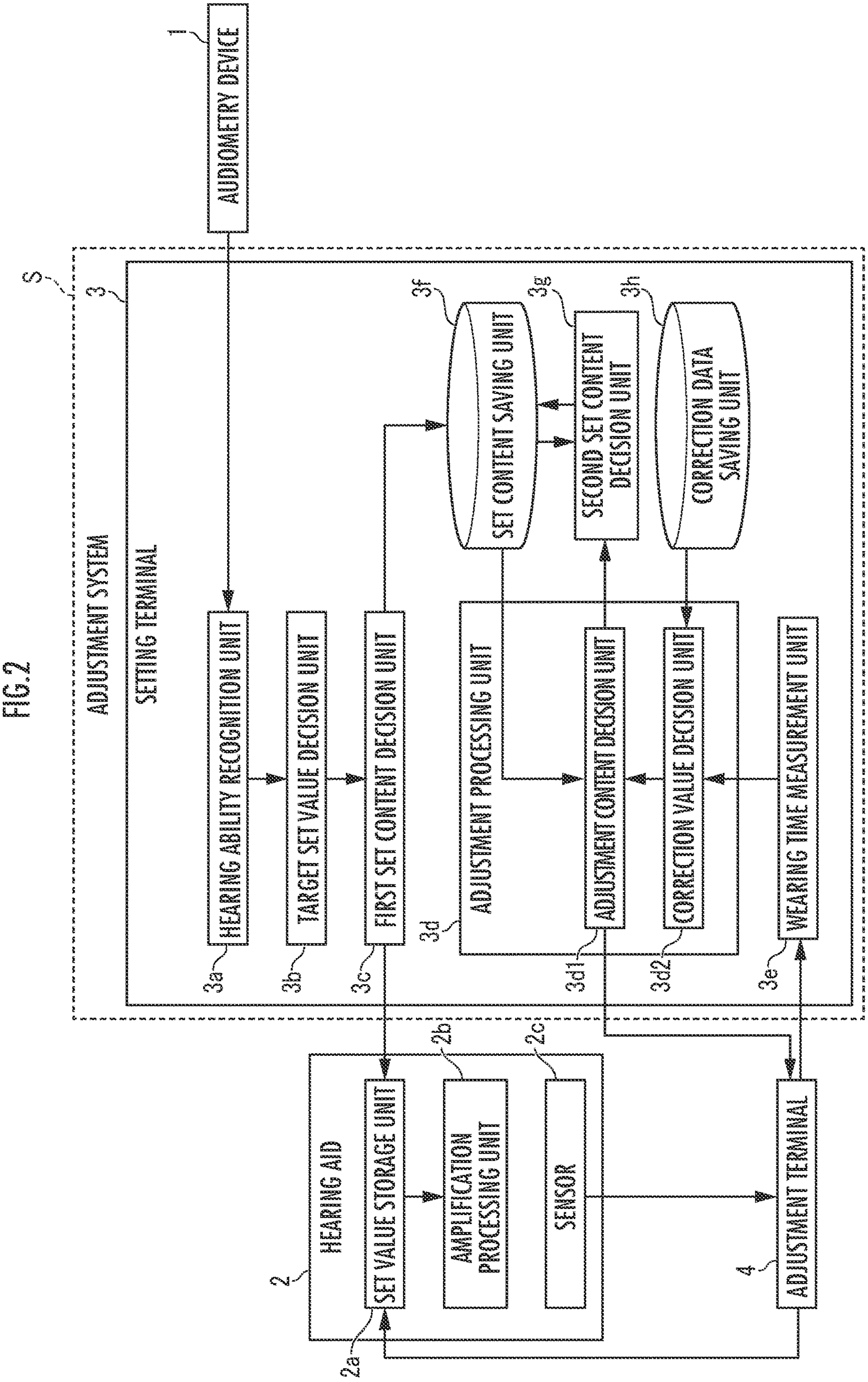
FIG. 2 is a block diagram illustrating a configuration of an adjustment system processing unit in FIG. 1.

As illustrated in FIG. 2, the hearing aid 2 includes a set value storage unit 2*a*, an amplification processing unit 2*b*, and a sensor 2*c* as functions (processing units) to be realized by implemented hardware configurations or programs.

In adjustment at each phase, the set value storage unit 2*a* acquires and stores an initial set value at each frequency decided by a first set content decision unit 3*c* described later and the set value at the concerned phase among the set value at each frequency at each phase which is decided by an adjustment content decision unit 3*d*1 described later.

Based on the set value stored in the set value storage unit 2*a*, the amplification processing unit 2*b* performs a process of amplifying a sound, which is from the outside and is input to the hearing aid 2, in accordance with the frequency of the sound. In the hearing aid 2, the sound amplified in such a manner is output toward the ear of the user.

The sensor 2*c* is a sensor for detecting whether or not the hearing aid 2 is worn. As the sensor 2*c*, for example, a known brightness sensor or the like can be employed. A detection result by the sensor 2*c* is transmitted to a wearing time measurement unit 3*e* described later.

Further, the setting terminal 3 includes a hearing ability recognition unit 3*a*, a target set value decision unit 3*b*, the first set content decision unit 3*c*, an adjustment processing unit 3*d*, the wearing time measurement unit 3*e*, a set content saving unit 3*f*, a second set content decision unit 3*g*, and a correction data saving unit 3*h* as functions (processing units) to be realized by implemented hardware configurations or programs.

The hearing ability recognition unit 3*a* recognizes a hearing ability level of the user at each frequency used in the pure-tone audiometry as the hearing ability of the user based on results of examinations using the audiometry device 1.

Note that the hearing ability recognition unit 3*a* may recognize the hearing ability of the user based on data that the adjustment person inputs by referring to results or the like of examinations by the audiometry device 1 as in the present embodiment or may recognize the hearing ability of the user based on data directly transmitted from the audiometry device 1.

The target set value decision unit 3*b* decides the target set value based on the hearing ability of the user which is recognized by the hearing ability recognition unit 3*a*. Here, the target set value denotes a set value at a phase at which a rehabilitation period is finished.

Note that the target set value may be recognized based on the hearing ability of the user. For example, the target set value may be obtained by calculation based on the hearing ability of the user at each time. Further, for example, in a case where a data table is present which represents a correlation between the purpose of use of the hearing aid and an ideal hearing ability corresponding to the purpose of use, the target set value may be acquired from the data table by comparing the ideal hearing ability corresponding to a request of the user with the current hearing ability of the user.

Based on the decided target set value, the first set content decision unit 3*c* decides the initial set value (the set value at a start of use) and the set values at respective subsequent phases. Further, the first set content decision unit 3*c* transmits the decided initial set value to the set value storage unit 2*a* of the hearing aid 2. Meanwhile, the first set content decision unit 3*c* saves the set values at the respective phases in the set content saving unit 3*f*.

The adjustment processing unit 3*d* executes adjustment of the hearing aid 2 in each predetermined period (for example, one week) after the start of use of the hearing aid 2 or execution of adjustment at each of the phases. The adjustment processing unit 3*d* has the adjustment content decision unit 3*d*1 and a correction value decision unit 3*d*2.

The adjustment content decision unit 3*d*1 acquires the set value at each of the phases from the set content saving unit 3*f* and decides a correction amount decided by the correction value decision unit 3*d*2. Subsequently, the adjustment content decision unit 3*d*1 corrects the set value at each of the phases by the correction amount and thereby decides a present set value. Further, the adjustment content decision unit 3*d*1 transmits the decided present set value to the set value storage unit 2*a* of the hearing aid 2 and saves that in the set content saving unit 3*f*.

The correction value decision unit 3*d*2 decides the correction amount for the present set value based on a wearing time measured by the wearing time measurement unit 3*e* and correction data acquired from the correction data saving unit 3*h*.

Based on a result of detection by the sensor 2*c* of the hearing aid 2, the wearing time measurement unit 3*e* measures the wearing time of the hearing aid 2 of the user with previous setting (specifically, the start of use or previous adjustment) being a start point.

Note that the wearing time is a time which is appropriately defined by a system designer based on the time in which the user is wearing the hearing aid. For example, the wearing time may be an accumulated total time in which the user is wearing the hearing aid, may be an average wearing time per day, or may be the number of cases where the time of continuous wearing exceeds a predetermined time.

The set content saving unit 3*f* saves the initial set value and the set values at the respective phases which are decided by the first set content decision unit of the setting terminal 3 and saves the next and subsequent set values which are decided by the second set content decision unit 3*g*.

The second set content decision unit 3*g* acquires the next and subsequent set values which are saved in the set content saving unit 3*f*, thereafter revises the next and subsequent set values based on the present set value decided by the adjustment content decision unit 3*d*1, and saves the revised set values in the set content saving unit 3*f*.

The correction data saving unit 3*h* saves various data serving as references in correcting the set value such as the priority and a change amount tolerated in each of the phases, for each of the set values defined for each frequency.

Note that as described above, the adjustment system S in the present embodiment is configured with the setting terminal 3 and is configured to be capable of communicating with the audiometry device 1 and the hearing aid 2 directly or via the adjustment terminal 4. However, the hearing aid adjustment system of the present invention is not limited to such a configuration, but apparatuses which include processing units configuring the hearing aid adjustment system may appropriately be changed.

For example, a part of the processing units included in the setting terminal 3 may be provided to the hearing aid 2, the adjustment terminal 4, a server which is separately installed on the outside, or the like, and the processing units may be omitted from the setting terminal 3

[Processes Executed in Processing Units]

Next, a process performed by the adjustment system S will be described with reference to FIG. 2 to FIG. 5.

[Process Executed at Start of Use]

First, a process to be executed at the start of use of the hearing aid 2 will be described with reference to FIG. 2 and FIG. 3.

Figure 3:
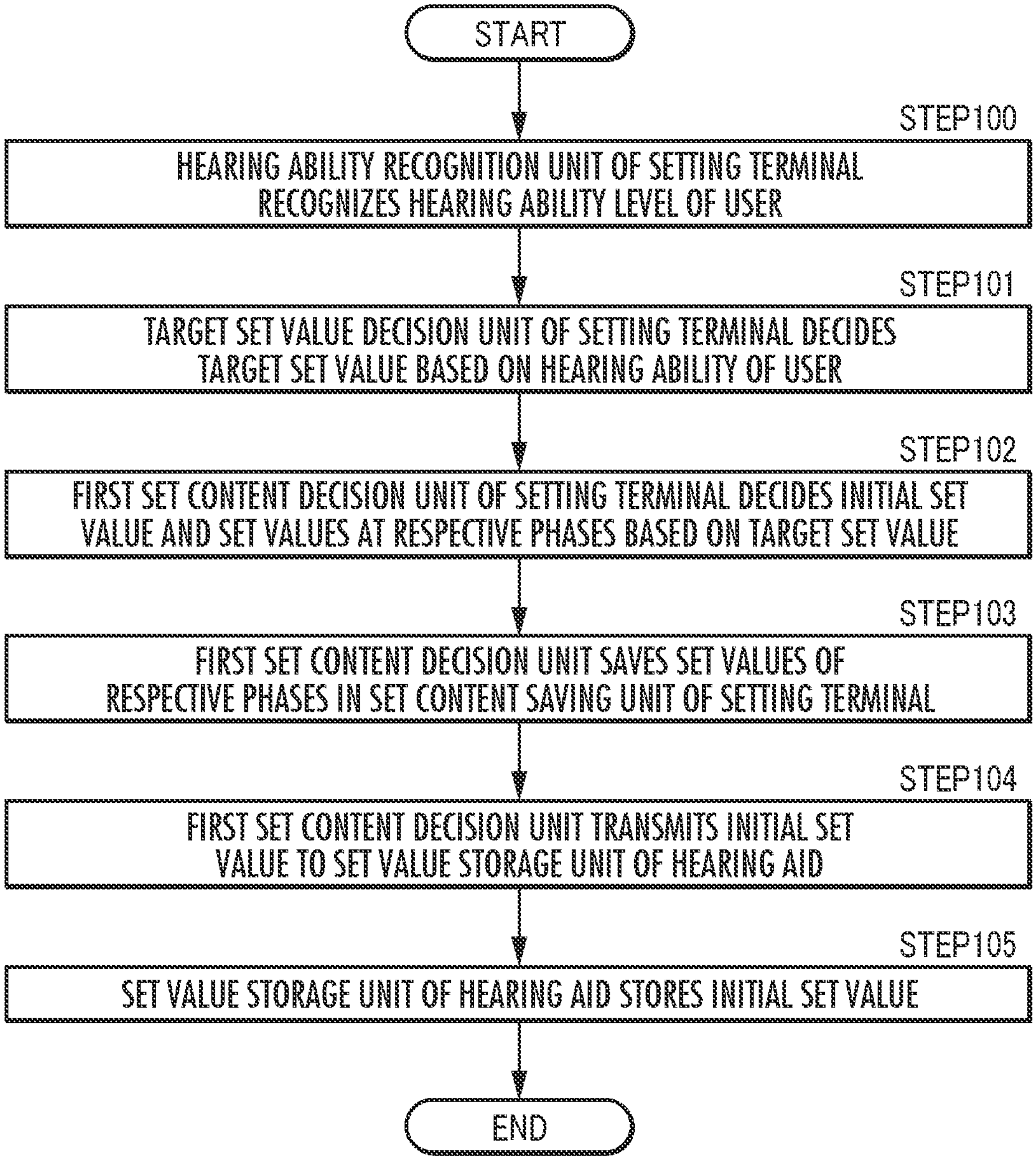
FIG. 3 is a flowchart illustrating a process which is executed when a hearing aid starts being used in the adjustment system and the hearing aid in FIG. 1.

In the process, the hearing ability recognition unit 3*a* of the setting terminal 3 first recognizes the hearing ability level of the user at each of the frequencies in the pure-tone audiometry, which is obtained by using the audiometry device 1, as the hearing ability of the user (STEP 100 in FIG. 3).

Next, the target set value decision unit 3*b* of the setting terminal 3 decides the target set value based on the recognized hearing ability of the user (STEP 101 in FIG. 3).

Next, based on the decided target set value, the first set content decision unit 3*c* of the setting terminal 3 decides the initial set value and the set values at the respective phases (STEP 102 in FIG. 3).

Note that the adjustment system S sets the initial set value to 70% of the target set value. The set values of the respective subsequent phases are set to values that are obtained by sequentially adding values, each of which is obtained by dividing the difference between the target set value and the initial set value into 12 equivalent parts, to the initial set value. This is because it is assumed that 1 month has 4 weeks and training is performed for 3 months (that is, 12 adjustments are performed) while the set value is adjusted at each week.

Next, the first set content decision unit 3*c* saves the set values of the respective phases in the set content saving unit 3*f* of the setting terminal 3 (STEP 103 in FIG. 3).

Next, the first set content decision unit 3*c* transmits the initial set value to the set value storage unit 2*a* of the hearing aid 2 (STEP 104 in FIG. 3).

Note that those STEP 103 and STEP 104 may simultaneously be executed, or STEP 104 may be executed before STEP 103.

Finally, the set value storage unit 2*a* of the hearing aid 2 stores the initial set value (STEP 105 in FIG. 3), and the present process is finished.

After the above process is executed, based on the initial set value stored in the set value storage unit 2*a*, the amplification processing unit 2*b* of the hearing aid 2 performs the process of amplifying a sound input to the hearing aid 2 in accordance with the frequency of the sound.

Note that in the adjustment system S, processes of STEP 100 to STEP 104 are executed by the setting terminal 3 configuring the adjustment system S. However, the hearing aid adjustment system of the present invention is not limited to such a configuration.

For example, the processes corresponding to STEP 100 to STEP 104 may be executed by a system independent from the hearing aid adjustment system, and only results of the processes by the independent system may be used by the hearing aid adjustment system. In such a case, processing units corresponding to the hearing ability recognition unit 3*a*, the target set value decision unit 3*b*, and the first set content decision unit 3*c* in the adjustment system S of the present invention may be omitted from the hearing aid adjustment system.

[Process Executed in Adjustment at Each Phase]

Next, a description will be made about a process (hearing aid adjustment method) to be executed in adjustment of the hearing aid 2 at each of the phases with reference to FIG. 2 and FIG. 4A to FIG. 4C. This process is a process which is executed at the start of use of the hearing aid 2 or in a predetermined period (seven days in the present embodiment) after adjustment at each of the phases.

Figure 4A:
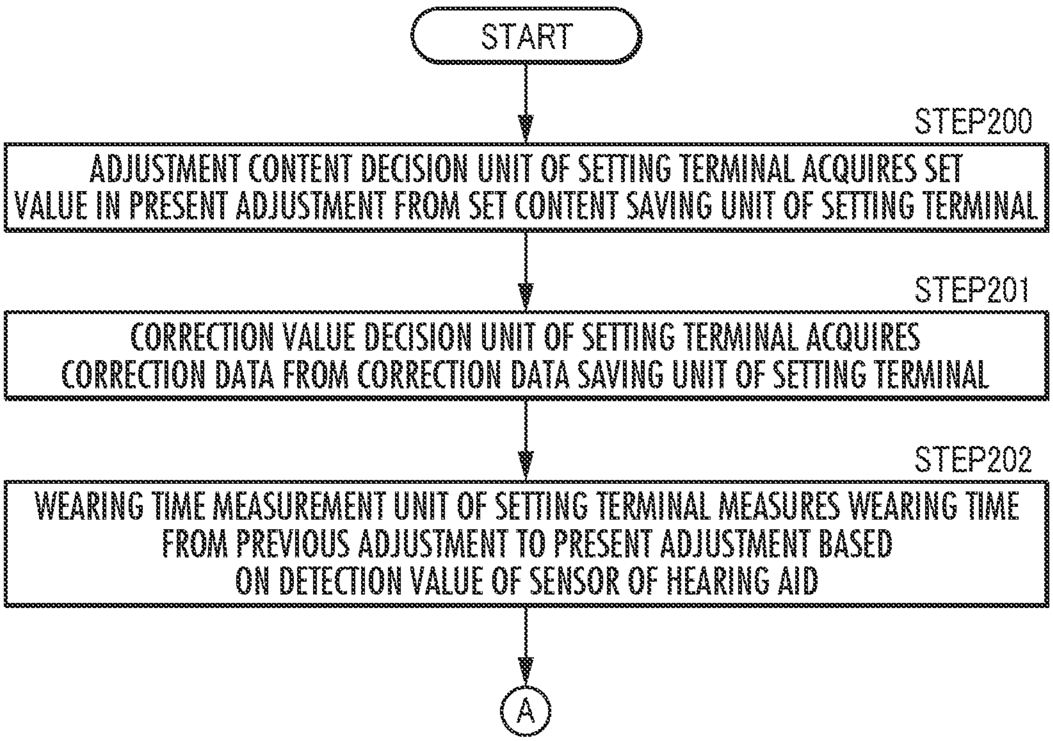
FIG. 4A is a flowchart illustrating a process of acquiring or measuring data for correction among processes to be executed in adjustment of the hearing aid at each phase in the adjustment system and the hearing aid in FIG. 1.

In the process, first, the adjustment content decision unit 3*d*1 of the adjustment processing unit 3*d* of the setting terminal 3 acquires the set value in the present adjustment, which is decided by the first set content decision unit 3*c* of the setting terminal 3, from the set content saving unit 3*f* of the setting terminal 3 (STEP 200 in FIG. 4A).

Next, the correction value decision unit 3*d*2 of the adjustment processing unit 3*d* of the setting terminal 3 acquires the correction data from the correction data saving unit 3*h* of the setting terminal 3 (STEP 201 in FIG. 4A).

Next, based on a detection value of the sensor 2*c* of the hearing aid 2, the wearing time measurement unit 3*e* of the setting terminal 3 measures the wearing time from the start of use of the hearing aid 2 or from the previous adjustment to the present adjustment (STEP 202 in FIG. 4A).

Figure 4B:
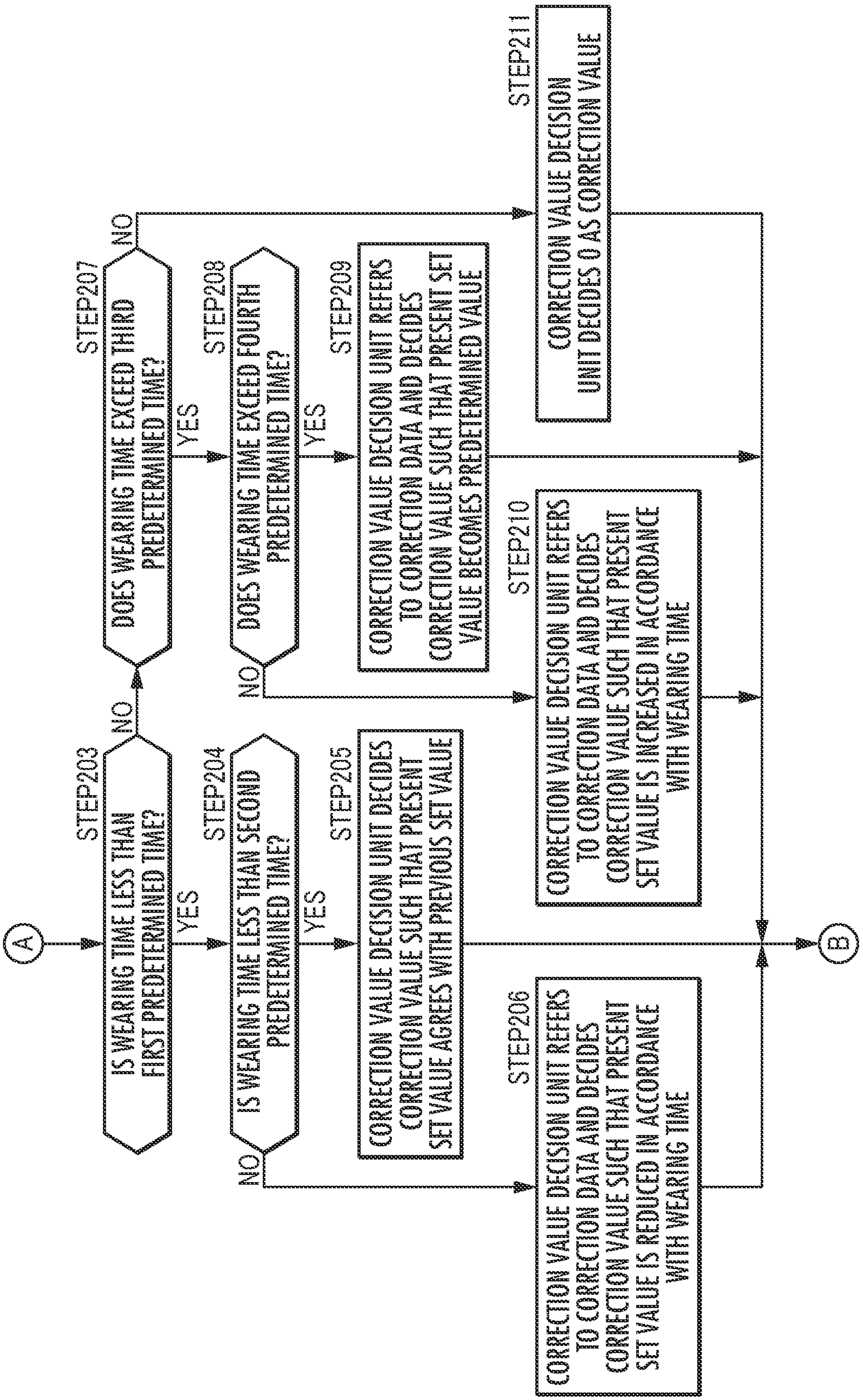
FIG. 4B is a flowchart illustrating a process of deciding a correction amount among the processes to be executed in adjustment of the hearing aid at each of the phases in the adjustment system and the hearing aid in FIG. 1.

Next, the correction value decision unit 3*d*2 determines whether or not the wearing time is less than a first predetermined time (STEP 203 in FIG. 4B).

Here, the first predetermined time is a time defined by studies and analyses. As the first predetermined time, for example, a lower limit value or the like of a recommended wearing time in performing rehabilitation about use of the hearing aid can be employed.

In a case where the wearing time is less than the first predetermined time (in a case of YES in STEP 203), the correction value decision unit 3*d*2 determines whether or not the wearing time is less than a second predetermined time which is shorter than the first predetermined time (STEP 204 in FIG. 4B).

Here, the second predetermined time is a time defined by studies and analyses. As the second predetermined time, for example, a lower limit value or the like of a wearing time necessary for the user to be accustomed to the set value at the time point in performing rehabilitation about use of the hearing aid can be employed.

In a case where the wearing time is less than the second predetermined time (in a case of YES in STEP 204), the correction value decision unit 3*d*2 decides a correction value such that the present set value agrees with the previous set value (STEP 205 in FIG. 4B).

On the other hand, in a case where the wearing time exceeds the second predetermined time (in a case of NO in STEP 204), the correction value decision unit 3*d*2 refers to the correction data acquired from the correction data saving unit 3*h* and decides the correction value such that the present set value is reduced in accordance with the wearing time (STEP 206 in FIG. 4B).

Specifically, the correction value decision unit 3*d*2 decides the correction value such that as the difference between the wearing time and the first predetermined time is larger, a change amount becomes smaller when the set value is changed from the previous set value to the present set value.

Among processes in STEP 203 to STEP 206, the processes in STEP 203, STEP 204, and STEP 206 are processes which are executed in a case where the wearing time is shorter than the first predetermined time. This is because as the difference between the wearing time in the period and the first predetermined time assumed to be necessary for accustoming the user in the period is larger, the possibility is higher that the user is not accustomed to sound based on the set value corresponding to the period.

As this process, when the present set value is corrected such that the change amount of the set value becomes smaller as the difference is larger, the sound based on the present set value becomes sound close to the sound based on the previous set value. Accordingly, even when the wearing time is shorter than the first predetermined time, the user is easily accustomed to the sound based on the present set value.

Note that when the correction value is decided, regardless of a frequency, smallness of the change amount (that is, the magnitude of the correction value in a negative direction) may evenly be set based on the magnitude of the difference between the wearing time and the first predetermined time, but the adjustment system S decides the correction value for each of the frequencies by referring to the correction data. This is because the frequency of the sound given priority is different in accordance with the purpose of use or the like of the hearing aid of the user.

Further, because it is sufficient that the correction value in this case is based on the magnitude of the difference between the wearing time and the first predetermined time, the change amount may linearly be made small proportionally to the magnitude of the difference, or the change amount may gradually be made small by dividing the magnitude of the difference into predetermined ranges.

Further, among processes in STEP 203 to STEP 206, the processes in STEP 203 to STEP 205 are processes which are executed in a case where the wearing time is shorter than the second predetermined time which is shorter than the first predetermined time. This is because in such a case, the user might not at all be accustomed to the sound based on the previous set value.

As this process, when the present set value is caused to agree with the previous set value, even in a case where the wearing time is shorter than the second predetermined time, the user can be inhibited from feeling sounds based on the present and subsequent set values to be extremely loud.

Note that in view of rehabilitation, even in such a case, it is preferable not to cause the present set value to agree with the previous set value but to raise the set value by a slight value (for example, even only a lowest increase amount set by a system setting person). Thus, instead of causing the present set value to agree with the previous set value as in the present embodiment, the correction value may be decided such that the change amount becomes the lowest increase amount.

On the other hand, in a case where the wearing time exceeds the first predetermined time (in a case of NO in STEP 203), the correction value decision unit 3*d*2 determines whether or not the wearing time exceeds a third predetermined time (STEP 207 in FIG. 4B).

Here, the third predetermined time is a time defined by studies and analyses. As the third predetermined time, for example, an upper limit value or the like of the recommended wearing time in performing rehabilitation about use of the hearing aid can be employed.

In a case where the wearing time exceeds the third predetermined time (in a case of YES in STEP 207), the correction value decision unit 3*d*2 determines whether or not the wearing time exceeds a fourth predetermined time which is longer than the third predetermined time (STEP 208 in FIG. 4B).

Here, the fourth predetermined time is a time defined by studies and analyses. As the fourth predetermined time, for example, an upper limit value or the like of a wearing time can be employed in which a degree of accustomedness of the user to sound with respect to the wearing time is unlikely to be improved for the set value at the time point in performing rehabilitation about use of the hearing aid.

In a case where the wearing time exceeds the fourth predetermined time (in a case of YES in STEP 208), the correction value decision unit 3*d*2 refers to the correction data acquired from the correction data saving unit 3*h* and decides the correction value such that the present set value becomes a predetermined value (STEP 209 in FIG. 4B).

On the other hand, in a case where the wearing time is equivalent to or less than a predetermined time (in a case of NO in STEP 208), the correction value decision unit 3*d*2 refers to the correction data acquired from the correction data saving unit 3*h* and decides the correction value such that the present set value is increased in accordance with the wearing time (STEP 210 in FIG. 4B).

Specifically, the correction value decision unit 3*d*2 decides the correction value such that as the difference between the wearing time and the third predetermined time is larger, the change amount becomes larger when the set value is changed from the previous set value to the present set value.

Among processes in STEP 207 to STEP 210, the processes in STEP 207, STEP 208, and STEP 210 are processes which are executed in a case where the wearing time is as sufficiently long as exceeding the third predetermined time. This is because as the difference between the wearing time in the period and the third predetermined time assumed to be necessary for accustoming the user in the period is larger, the possibility is higher that the user is accustomed, more than assumption, to sound based on the set value corresponding to the period.

In a case where the wearing time is as sufficiently long as exceeding the third predetermined time, as this process, even when the present set value is corrected such that the change amount of the set value becomes larger as the difference is larger, the user can be accustomed to the sound based on the present set value without excessive stress.

Further, among processes in STEP 207 to STEP 210, the processes in STEP 207 to STEP 209 are processes which are executed in a case where the wearing time exceeds the fourth predetermined time which is longer than the third predetermined time (that is, in a case where the wearing time is unnecessarily longer than the third predetermined time). This is because in such a case, when the processes in STEP 207, STEP 208, and STEP 210 are executed, the set value (further, sound amplified based on that) might become extremely large.

In a case where the wearing time is unnecessarily longer than the third predetermined time, as this process, when the change amount of the set value is caused to become a constant amount, the sound based on the present set value does not become extremely loud compared to the sound based on the previous set value.

On the other hand, in a case where the wearing time is equivalent to or less than the third predetermined time (in a case of NO in STEP 207), the correction value decision unit 3*d*2 decides zero as the correction value (STEP 211 in FIG. 4B).

Figure 4C:
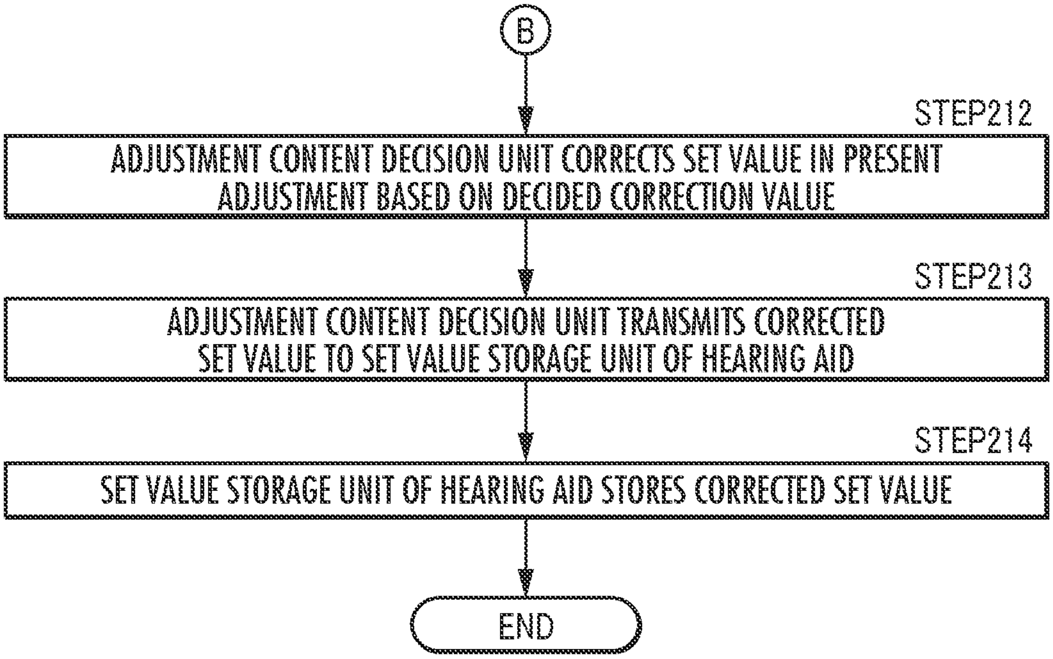
FIG. 4C is a flowchart illustrating a process of correcting a set value among the processes to be executed in adjustment of the hearing aid at each of the phases in the adjustment system and the hearing aid in FIG. 1.

After the correction amount is decided by the processes in STEP 203 to STEP 211, the adjustment content decision unit 3*d*1 corrects the set value in the present adjustment based on the decided correction value (STEP 212 in FIG. 4C).

Next, the adjustment content decision unit 3*d*1 transmits the corrected set value to the set value storage unit 2*a* of the hearing aid 2 (STEP 213 in FIG. 4C).

Next, the set value storage unit 2*a* of the hearing aid 2 stores the corrected set value (STEP 214 in FIG. 4C), and the present process is finished.

After the above process is executed, based on the corrected set value stored in the set value storage unit 2*a*, the amplification processing unit 2*b* of the hearing aid 2 performs the process of amplifying a sound input to the hearing aid 2 in accordance with the frequency of the sound.

As described above, in adjustment at each of the phases, the adjustment system S corrects the present set value based on the measured wearing time. This is because a strong correlation is present between how much the user is accustomed to the sound amplified by the hearing aid and the wearing time of the hearing aid and the wearing time can thus be considered to be the degree of accustomedness to the sound based on the set value in the wearing time. Accordingly, the adjustment system S can make sound based on a new set value become sound close to the sound to which the user is accustomed so far.

Consequently, in the adjustment system S and the adjustment method executed by that, because even when the set value is changed, the sound based on the set value can be made sound close to the sound to which the user is accustomed, hearing can efficiently be improved while excessive stress to be felt by the user is alleviated.

Note that it is sufficient that the hearing aid adjustment system and the hearing aid adjustment method correct the present set value based on the measured wearing time in adjustment at each of the phases.

Thus, for example, the processes in STEP 207 to STEP 210 in the present embodiment may be omitted, and only the processes may be performed which reduce the set value in a case where the wearing time is less than a predetermined time. Conversely, the processes in STEP 203 to STEP 206 may be omitted, and only the processes may be performed which increase the set value in a case where the wearing time exceeds a predetermined time.

Further, in the processes for reducing or increasing the set value, without providing a threshold value as a lower limit or an upper limit (the second predetermined time or the fourth predetermined time in the present embodiment), a setting value may simply be reduced or increased in accordance with the wearing time.

[Process Executed After Adjustment at Each Phase]

Next, a description will be made about a process to be executed after adjustment of the hearing aid 2 at each of the phases with reference to FIG. 2 and FIG. 5.

Figure 5:
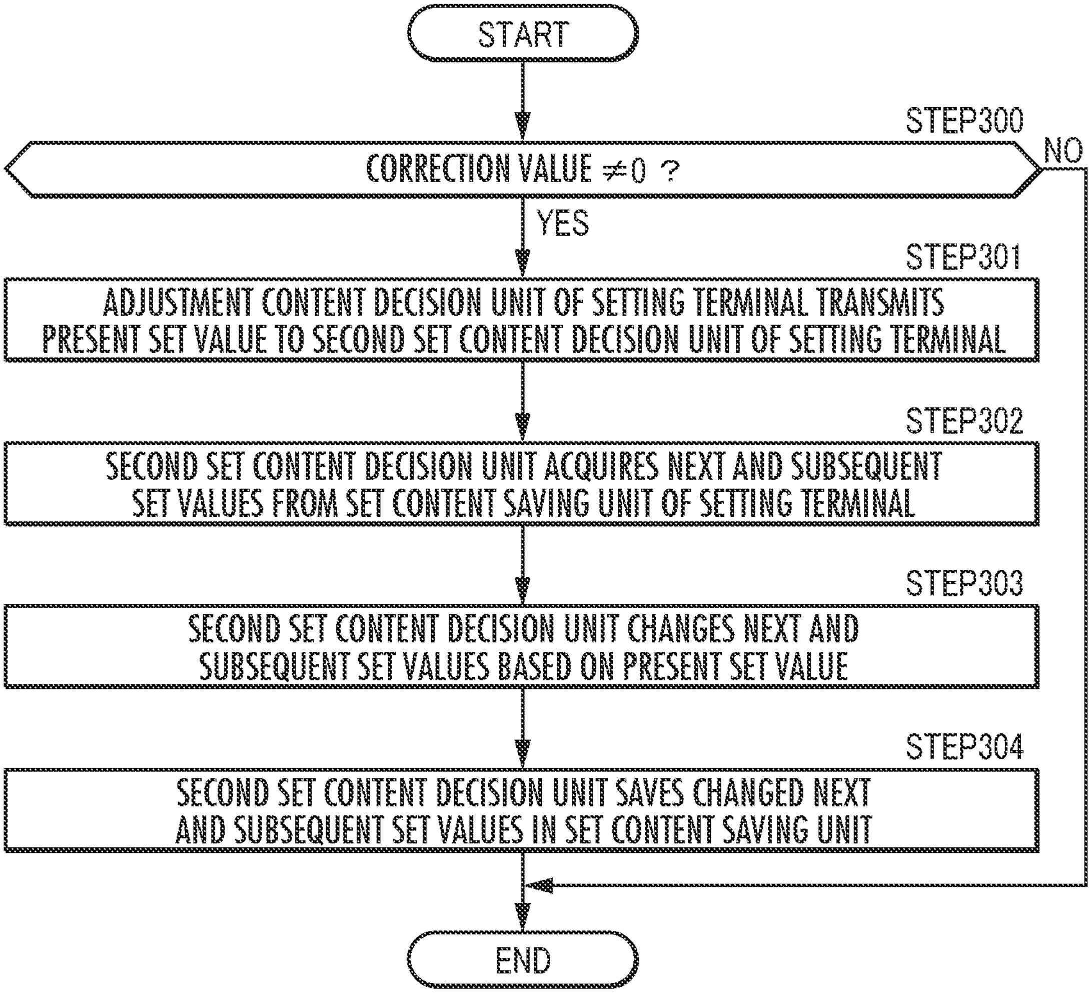
FIG. 5 is a flowchart illustrating a process executed after adjustment of the hearing aid at each of the phases in the adjustment system in FIG. 1.

In this process, first, the adjustment content decision unit 3*d*1 of the setting terminal 3 determines whether or not the correction value is other than zero (STEP 300 in FIG. 5).

In a case where the correction value is other than zero (in a case of YES in STEP 300), the adjustment content decision unit 3*d*1 transmits the present set value (that is, the corrected set value) to the second set content decision unit 3*g* of the setting terminal 3 (STEP 301 in FIG. 5).

Next, the second set content decision unit 3*g* acquires the next and subsequent set values from the set content saving unit 3*f* of the setting terminal 3 (STEP 302 in FIG. 5).

Next, the second set content decision unit 3*g* changes the next and subsequent set values based on the present set value (STEP 303 in FIG. 5).

Specifically, for example, the second set content decision unit 3*g* calculates the difference between the target set value and the present set value, thereafter divides the difference by the number of adjustments which are planned and remain, and calculates the change amounts at the respective phases (further, the set values at the respective phases).

Next, after the next and subsequent set values are changed (after execution of STEP 303) or in a case where the correction value is zero (in a case of NO in STEP 300), the second set content decision unit 3*g* stores the changed next and subsequent set values in the set content saving unit 3*f* (STEP 304 in FIG. 5), and the present process is finished.

A reason why such update of the set values is performed is because a case might occur where the difference between the present set value and the next set value becomes excessively large or excessively small as a result of changing the change amount of the present set value by the adjustment processing unit 3*d*. Further, the update is performed in order to inhibit the user from feeling excessive discomfort or to inhibit the time, in which the user is accustomed to the amplified sound, from becoming long after the next and subsequent adjustments.

However, a process by the second set content decision unit 3*g* is not necessarily required. For example, in a case where the target set value is not very much separated from the hearing ability level of the user in an initial state (that is, a case of mild hearing loss), because the difference between the present set value and the next set value is not very much changed even when correction is performed, the process by the second set content decision unit 3*g* may be omitted.

Note that in the adjustment system S of the present embodiment, the number of adjustments of the set value until the target set value is reached is fixed; however, the adjustment system of the present invention may change the number of adjustments in accordance with the change amount of the set value at each of the phases.

In a case of a configuration in which the number of adjustments is changed in such a manner, as described above, in a case where a configuration is made such that the change amount is increased in a case where the wearing time exceeds the third predetermined time (see STEP 207 to STEP 210 in FIG. 4B), the number of adjustments necessary for reaching the final target set value can be reduced.

REFERENCE SIGNS LIST

1 audiometry device
2 hearing aid
2*a* set value storage unit
2*b* amplification processing unit
2*c* sensor
3 setting terminal
3*a* hearing ability recognition unit
3*b* target set value decision unit
3*c* first set content decision unit
3*d* adjustment processing unit
3*d*1 adjustment content decision unit
3*d*2 correction value decision unit
3*e* wearing time measurement unit
3*f* set content saving unit
3*g* second set content decision unit
3*h* correction data saving unit
4 adjustment terminal
S adjustment system (hearing aid adjustment system)

The invention claimed is:

1. A hearing aid adjustment system for performing adjustment at a start of each of multiple predetermined periods such that a set value about an amplification degree with respect to sound of a hearing aid gradually approaches a target set value in each said predetermined period by changing the set value in each said predetermined period, the hearing aid adjustment system comprising:

a target set value decision unit which decides the target set value;

a set content decision unit which decides the set value in each said predetermined period based on the target set value;

a wearing time measurement unit which measures a wearing time of the hearing aid of a user of the hearing aid in each said predetermined period; and an adjustment processing unit which performs adjustment of the hearing aid based on the set value in each said predetermined period, wherein in adjustment at the start of each said predetermined period, the adjustment processing unit corrects the set value corresponding to the present predetermined period based on the wearing time measured in the previous predetermined period.

2. A hearing aid adjustment system for performing adjustment such that a set value about an amplification degree with respect to sound of a hearing aid gradually approaches a target set value by changing the set value in each of multiple predetermined periods, the hearing aid adjustment system comprising:

a target set value decision unit which decides the target set value;

a set content decision unit which decides the set value in each predetermined period based on the target set value;

a wearing time measurement unit which measures a wearing time of the hearing aid of a user of the hearing aid after previous adjustment; and an adjustment processing unit which performs adjustment of the hearing aid based on the set value in each predetermined period, wherein in a case where the measured wearing time is below a first predetermined time, in adjustment after the wearing time is measured, the adjustment processing unit corrects the present set value such that as a difference between the wearing time and the first predetermined time is larger, a change amount of the set value becomes smaller.

3. The hearing aid adjustment system according to claim 2, wherein in a case where the measured wearing time is below a second predetermined time which is shorter than the first predetermined time, in adjustment after the wearing time is measured, the adjustment processing unit corrects the present set value such that the set value agrees with the previous set value regardless of the difference between the wearing time and the first predetermined time.

4. A hearing aid adjustment system for performing adjustment such that a set value about an amplification degree with respect to sound of a hearing aid gradually approaches a target set value by changing the set value in each of multiple predetermined periods, the hearing aid adjustment system comprising:

a target set value decision unit which decides the target set value;

a set content decision unit which decides the set value in each said predetermined period based on the target set value;

a wearing time measurement unit which measures a wearing time of the hearing aid of a user of the hearing aid after previous adjustment; and an adjustment processing unit which performs adjustment of the hearing aid based on the set value at each phase, wherein in a case where the measured wearing time exceeds a third predetermined time, in adjustment after the wearing time is measured, the adjustment processing unit corrects the present set value such that as a difference between the wearing time and the predetermined time is larger, a change amount of the set value becomes larger.

5. The hearing aid adjustment system according to claim 4, wherein in a case where the measured wearing time exceeds a fourth predetermined time which is longer than the third predetermined time, in adjustment after the wearing time is measured, the adjustment processing unit corrects the present set value such that the change amount of the set value becomes a constant amount regardless of the difference between the wearing time and the third predetermined time.

6. A hearing aid adjustment system for performing adjustment at a start of each of multiple predetermined periods such that a set value about an amplification degree with respect to sound of a hearing aid gradually approaches a target set value in each said predetermined period by changing the set value in each predetermined period, the hearing aid adjustment system comprising a setting terminal that includes a target set value decision unit which decides the target set value, a set content decision unit which decides the set value in each said predetermined period based on the target set value, a wearing time measurement unit which measures a wearing time of the hearing aid of a user of the hearing aid in each said predetermined period, and an adjustment processing unit which performs adjustment of the hearing aid based on the set value in each said predetermined period, wherein the setting terminal and the hearing aid are capable of mutual information communication, and in adjustment at the start of each predetermined period, the adjustment processing unit corrects the set value corresponding to the present predetermined period based on the wearing time measured in the previous predetermined period.

7. A hearing aid adjustment method of performing adjustment at a start of each of multiple predetermined periods such that a set value about an amplification degree with respect to sound of a hearing aid gradually approaches a target set value in each said predetermined period by changing the set value in each predetermined period, the hearing aid adjustment method comprising:

a step of deciding the target set value;

a step of deciding the set value in each said predetermined period based on the target set value;

a step of measuring a wearing time of the hearing aid of a user of the hearing aid in each said predetermined period; and a step of performing adjustment of the hearing aid based on the set value n each said predetermined period, wherein in the step of performing adjustment of the hearing aid, in adjustment at the start of each said predetermined period, the set value corresponding to the present predetermined period is corrected based on the wearing time measured in the previous predetermined period.

* * * * *